(12) United States Patent
Nemish

(10) Patent No.: US 7,509,988 B1
(45) Date of Patent: Mar. 31, 2009

(54) ADJUSTABLE CLAMP WITH GRIPPING WHEELS

(76) Inventor: Stephen C. Nemish, 312 Wynstay Ave., Valley Park, MO (US) 63088

( * ) Notice: Subject to any disclaimer, the term of this patent is extended or adjusted under 35 U.S.C. 154(b) by 0 days.

(21) Appl. No.: 11/943,319

(22) Filed: Nov. 20, 2007

(51) Int. Cl.
*B60C 25/00* (2006.01)
(52) U.S. Cl. .......................... 157/17; 157/21
(58) Field of Classification Search ............. 157/16–18, 157/14, 21
See application file for complete search history.

(56) References Cited

U.S. PATENT DOCUMENTS

| | | | | |
|---|---|---|---|---|
| 1,285,928 A | * | 11/1918 | Butler | 157/18 |
| 2,171,282 A | * | 8/1939 | Wochner | 157/21 |
| 3,789,894 A | * | 2/1974 | Adams | 157/17 |
| 3,923,090 A | * | 12/1975 | Kinney | 157/17 |
| 4,093,006 A | * | 6/1978 | Hessels | 157/18 |
| 6,039,104 A | * | 3/2000 | Cunningham et al. | 157/21 |
| 7,159,633 B2 | | 1/2007 | Nemish | |

\* cited by examiner

*Primary Examiner*—Hadi Shakeri
(74) *Attorney, Agent, or Firm*—Charles McCloskey

(57) ABSTRACT

A manual device, for use in tire changing without power equipment, provides a frame with two gripping wheels that engage the rim of a wheel. The frame adjusts in a direction along a radius of a wheel. The adjustable frame allows the present invention to grip wheels of various diameters in a dogging pattern on a stand or rack. The wheels are non-marring and have a perimeter groove that allows a rim to partially seat within the wheel for a firm grip of the frame in a clamping action with other frames of the present invention. Three of the present invention, operated simultaneously, secure a rim of a wheel to a stand or rack without marring the wheel.

7 Claims, 7 Drawing Sheets

ADJUSTABLE CLAMP WITH GRIPPING WHEELS

BACKGROUND OF THE INVENTION

The adjustable clamp with gripping wheels generally relates to manual tire changing machinery and more specifically to a clamp that moves along a radius from a hub with wheels that grip the rim of the wheel without marring.

In bays, garages, and shops around the world, numerous motor cycle and other light vehicle tires are changed from wheels every day. During a tire change, a worn or damaged tire is removed from a wheel and a new tire is placed upon the rim. Tires have sidewalls upon both sides of the tire that extend partially towards the center. At the innermost portion of the sidewall, the tire has an encased bead. The bead is a thickened portion of the sidewall surrounding metal wire. Opposite the bead, the tread of the tire extends upwardly and outwardly from the sidewalls. On some tires, the tread and sidewalls have a flush joining such as for racing on pavement and on other tires, the tread rolls outwardly from the sidewalls and has a knobby appearance for off road racing. A wheel generally has two parallel rims that extend around the circumference of the wheel. The rims have a diameter slightly larger than the diameter of the bead thus the bead requires stretching during mounting and demounting of a tire from a wheel.

Tire changing involves mounting a tire upon a wheel or removing a tire from a wheel. A common tool used in tire changing is the spoon. A spoon, a round elongated bar, has sufficient length for leverage to stretch a bead. During mounting and demounting a tire from a wheel, the rim is clamped into a fixed position upon a rack or other assembly. The Applicant holds U.S. Pat. No. 7,159,633 upon a wheel clamping assembly where the clamps with a beveled head are located at a known radius from the center of the rim. During mounting, the wheel is clamped upon a rack and one bead of the tire is placed over a rim as much as possible. The head of a spoon is then placed upon the rim to stretch the remainder of the bead onto the rim. The other side of the tire is installed in a similar manner and the tire is inflated as both beads seat upon their respective rims. For removing a tire from a wheel, the wheel is clamped again into a fixed position. The tire is partially deflated and a spoon, inserted between a bead and a rim, is then rotated toward the center of the wheel thus stretching the bead from the rim. After moving the spoon around the rim, the bead separates from the rim and the second bead undergoes the same demounting procedure.

Wheels are used on many vehicles. The after market in wheels of all kinds exceeds $5 million in annual sales. On utility vehicles, the appearance of wheels matters less so than on personal vehicles. For automobiles, motorcycles, and some boat trailers, the appearance of the wheels has high importance to the drivers. The appearance of the wheels on a vehicle becomes part of the self image of the driver. Often, people buy shiny, or novelty, wheels to customize vehicles. In particular, motorcycles have shiny wheels including the spokes and the rims. The shine upon the wheels comes from a metal alloy, or metal plating, upon the wheel, particularly the rim. Alloys and plating are readily damaged by the harder materials, that is tool steel, usually contained in shop tools and equipment. So much so, that shop tools and equipment are known to mar wheels. The owners of shiny wheels have little tolerance, both aesthetically and financially, for shop caused blemishes upon their wheels.

DESCRIPTION OF THE PRIOR ART

Traditionally, wheels, even shiny wheels, have been clamped to stands and racks for tire mounting, demounting, balancing and other procedures. The metal clamps are generally made of hardened steel or other alloy. Once clamped in place, a typical tire can be mounted and demounted manually using spoons as previously described. The hardness of the steel clamps causes the clamps to mar hubs of softer material, such as aluminum and its alloys. Existing clamps have gripping surfaces generally made of steel that mar rims or even leave the imprint of the gripping pattern upon the rim. As the typical clamp is steel, the repeated clamping of a rim for various services abrades the rim surface. In time, the abrasions of the rim accumulate and discolor the finish of the rim, or even cause rust upon ferrous rims. For drivers and motorcyclists sensitive to the appearance of their wheels, marring is not acceptable.

The present invention overcomes the difficulties of marring a wheel during clamping of rims for usage of tools at garages and shops of all sizes.

SUMMARY OF THE INVENTION

Generally, the present invention provides a frame with two gripping wheels that engage the rim of a wheel. The frame is adjustable in a direction along a radius of a wheel. The adjustable frame allows the present invention to grip wheels of various diameters, not just those at known diameters, in a dogging pattern on a stand or a rack. The wheels are non-marring and have a perimeter groove that allows a rim to partially seat within the wheel for a firm grip of the frame in a clamping action with other frames of the present invention. Three of the present invention, operated simultaneously, can secure a rim to a stand or rack without marring the rim.

There has thus been outlined, rather broadly, the more important features of the invention in order that the detailed description thereof that follows may be better understood and that the present contribution to the art may be better appreciated. The present invention also includes a non-marring base pad, a recessed scoop in the frame to admit a wider tire, and a hex head adjusting screw drive for the frame. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved adjustable clamp with gripping wheels.

Another object is to provide such an adjustable clamp with gripping wheels that operates without marring the surface of a wheel.

Another object is to provide such an adjustable clamp with gripping wheels that permits replacement of its wheels once worn.

Another object is to provide such an adjustable clamp with gripping wheels that moves upon a frame arm radially without power tools.

Another object is to provide such an adjustable clamp with gripping wheels that grips a wheel rim to assist in mounting and demounting a tire upon the wheel.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
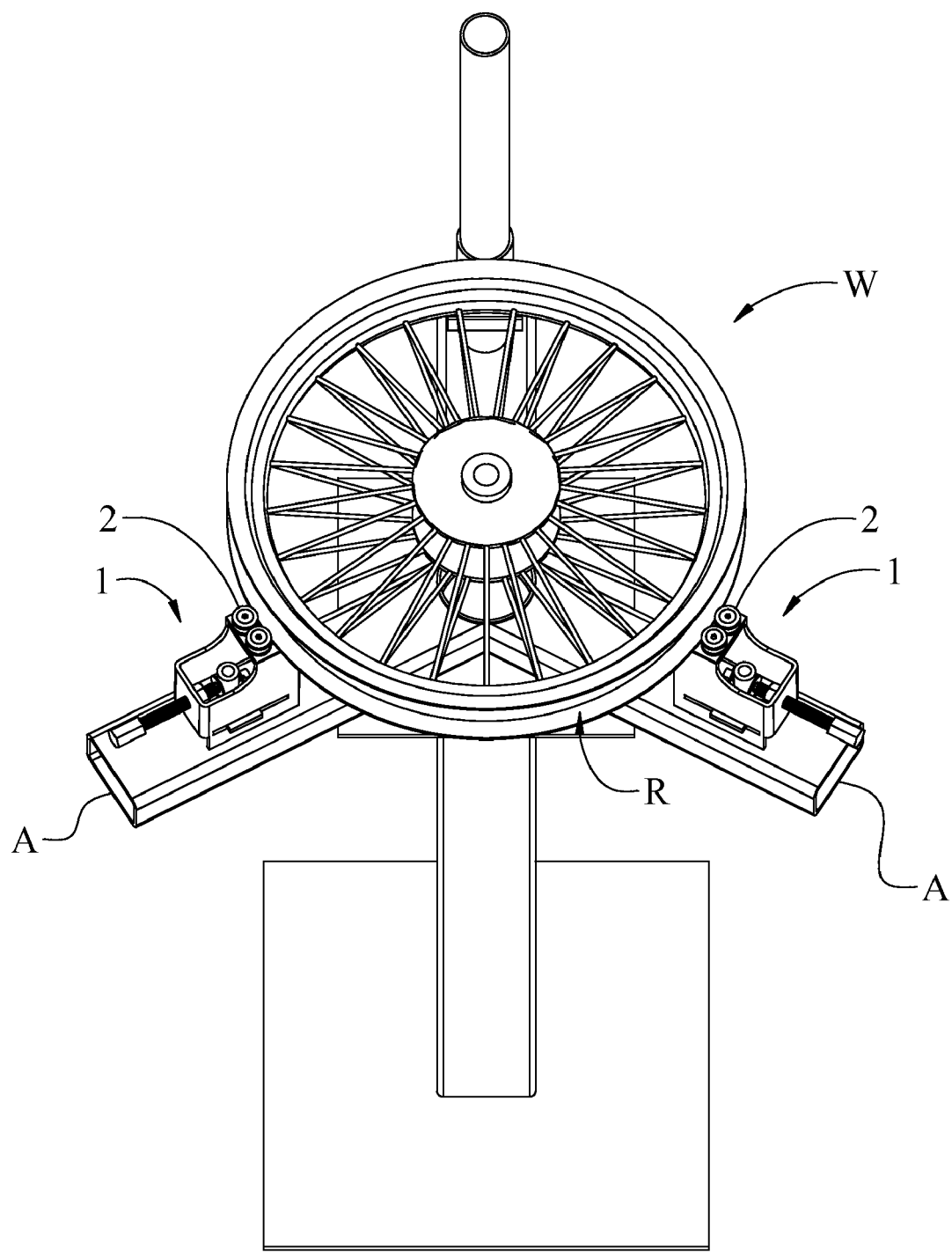
FIG. 1 shows an isometric view of the present invention located upon a rack for securing a rim.

The present invention overcomes the prior art limitations by providing an adjustable clamp with gripping wheels that secures the rim of a wheel upon a rack. Three of the present invention 1 are shown in FIG. 1 clamping a wheel W upon the arms A of a rack R. Upon each of the present invention, a pair of gripping wheels 2 abut the rim and by friction secure the wheel in place. Each clamp 1 is adjustable radially along an arm A using a threaded rod 3 with a head 4, here shown as hexagonally shaped. Turning the rods 3 of three adjustable clamps 1 allows a user to secure wheels having various diameters. Generally the user secures the wheel so that the center of the hub aligns with the center of the rack.

Figure 2:
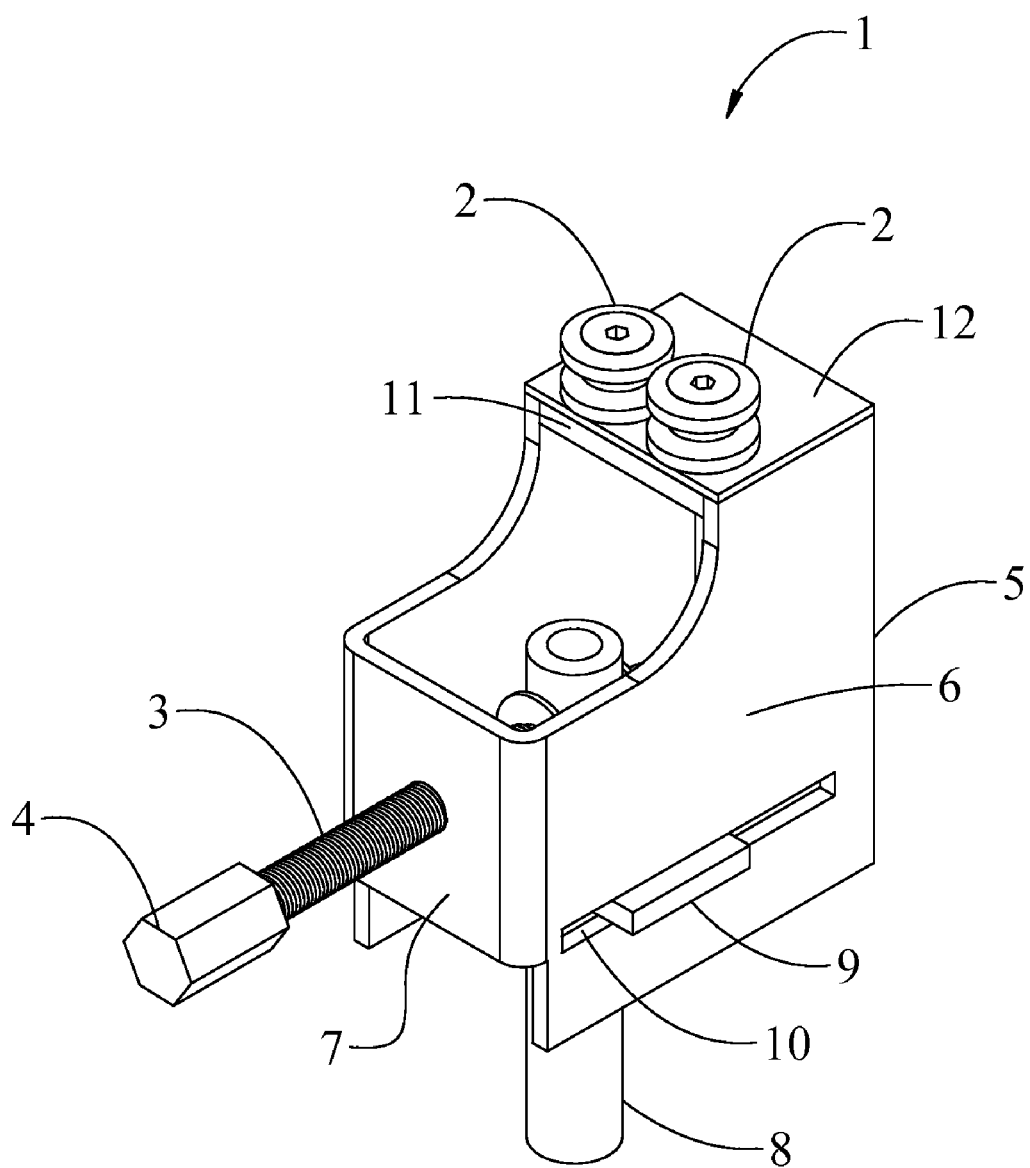
FIG. 2 shows an isometric view of the present invention.

A clamp of the present invention 1 is shown in FIG. 2 generally having a frame 5 to which attach the adjusting and non-marring components. The frame has a generally inverted U shape with two mutually parallel and spaced apart sides 6. Upon the front, or outer end away from the rack, the frame has a panel 7 that spans between the sides 6. The panel has a threaded hole therethrough into which turns the threaded rod 3 and opposite the panel, the head 4 receives a driver, such as a socket or wrench. The threaded hole is generally centered on the panel 7. Alternatively, the threaded rod advances through a threaded nut attached to the panel centered upon an unthreaded hole. Opposite the head 4, the threaded rod engages a pin 8, generally perpendicular to the rod. The threaded rod rotates within an aperture through the pin, or alternatively in a journaled bearing in the pin. Rotation of the threaded rod clockwise moves the pin away from the panel 7 while rotation counterclockwise brings the pin closer to the panel. Movement of the pin relative to the frame 5 finely adjusts the position of the clamp 1 upon the arm of a frame for precise gripping of a rim.

Below the threaded rod, the pin 8 secures to a flat bar 9. The pin extends through the center of the bar and the bar extends outwardly through cooperating slots 10 in each of the sides. The bar has a generally thin rectangular cross section that fits within the elongated rectangular slots. The slots are generally parallel to the axis of the threaded rod. The bar, within the slots, in cooperation with the connection, of the threaded rod to the pin, maintains the pin perpendicular to the threaded rod as the frame moves inwardly and outwardly.

Upon the frame opposite the panel 7 and generally above the pin 8, the frame has a top 11. The top is generally perpendicular to the panel and has the same width as the panel so that the sides remain parallel. The top is rectangular and of thin cross section. Upon the top, the clamp has a non-marring layer 12 generally below the pair of wheels 2. The non-marring layer is slightly larger in width and length than the top as it covers both the top and the exposed ends of the sides. The non marring layer prevents marring of a rim when moved on and off the wheels. The wheels 2 secure through the non-marring layer and into the top.

Figure 3:
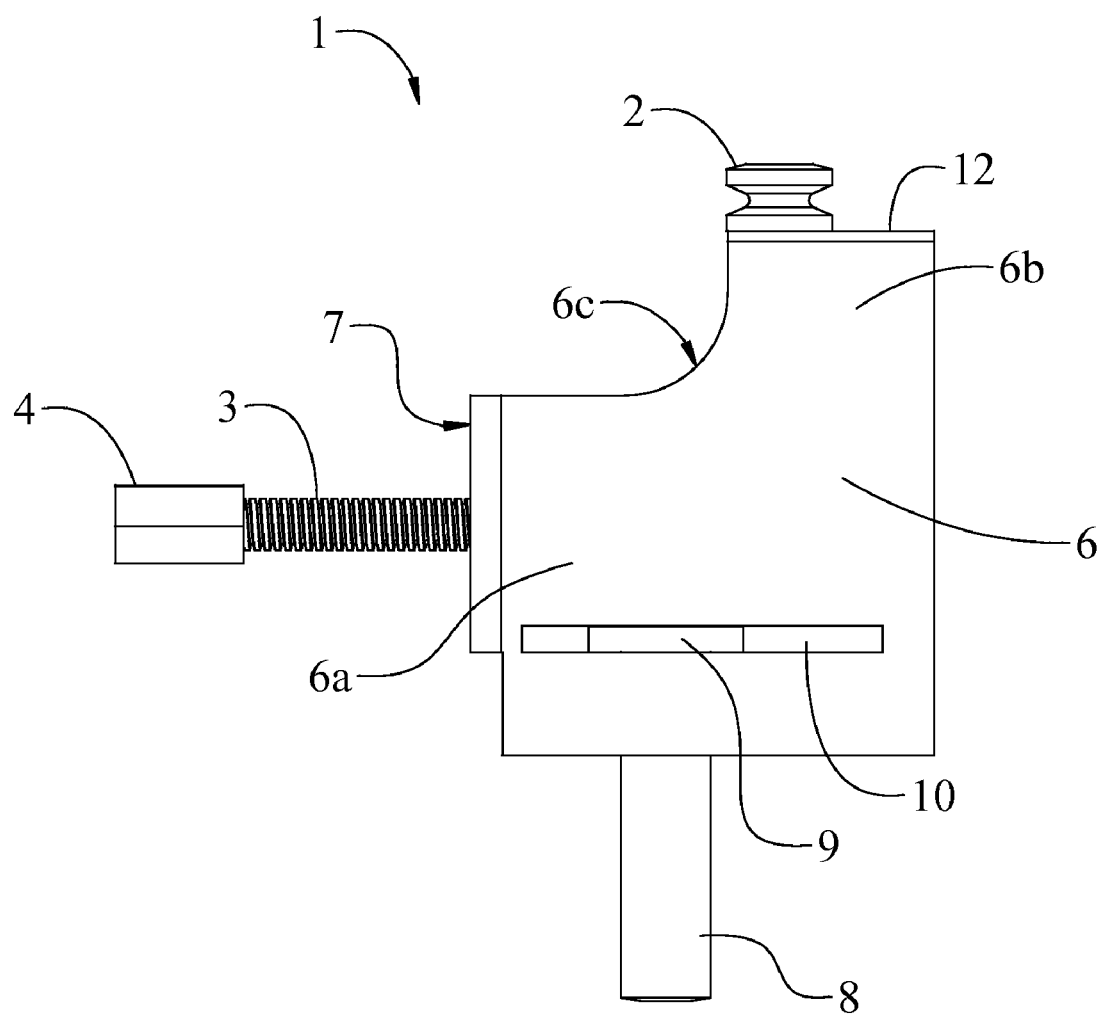
FIG. 3 describes a side view of the present invention.

Turning the clamp 1, FIG. 3 shows the clamp from the side. The frame has a generally inverted U shaped cross section when viewed on end but each side 6 has a generally rotated L shape. Each side has a web 6a that extends for the length of the frame and has the slot 10 for moving the bar 9 holding the pin 8 inwardly and outwardly along the center of the frame. Upon one end, the web 6a folds over to the panel 7 which then folds over to the opposite web. The panel supports the rotating threaded rod 3 with its head 4. Opposite the panel, each side has a flange 6b. Each flange extends upwardly from the web and generally above the threaded rod. Each flange has a rectangular planar form but of less length than the web. In the preferred embodiment, the flange extends from the web and has an arcuate edge, as at 6c, spanning the interior corner formed by the flange and the web.

Upon the two mutually parallel webs, the top 11 joins the frame. The top has a generally rectangular shape of similar width to the panel 7 so that the sides remain mutually parallel and spaced apart. Preferably, the top is welded to the flanges. The non-marring layer 12 then rests upon the top and extends over the top to cover the exposed edges of the webs. Then upon the non-marring layer a pair of wheels 2 connect to the top 1, though one wheel on edge is shown. The wheels are located upon the non-marring layer generally flush to a tangent upon the arcuate edge 6c.

As before, the pin 8 extends through a bar 9 here shown on edge in a slot 10 in the web 6a. The pin connects to the threaded rod in an aperture or journaled bearing, where turning of the threaded rod moves the pin towards or away from the wheels 2. The edge of the bar in the slot and the spaced apart aperture connecting to the threaded rod prevent the pin from tipping and allow for smooth movement of the frame upon an arm of a rack.

Figure 4:
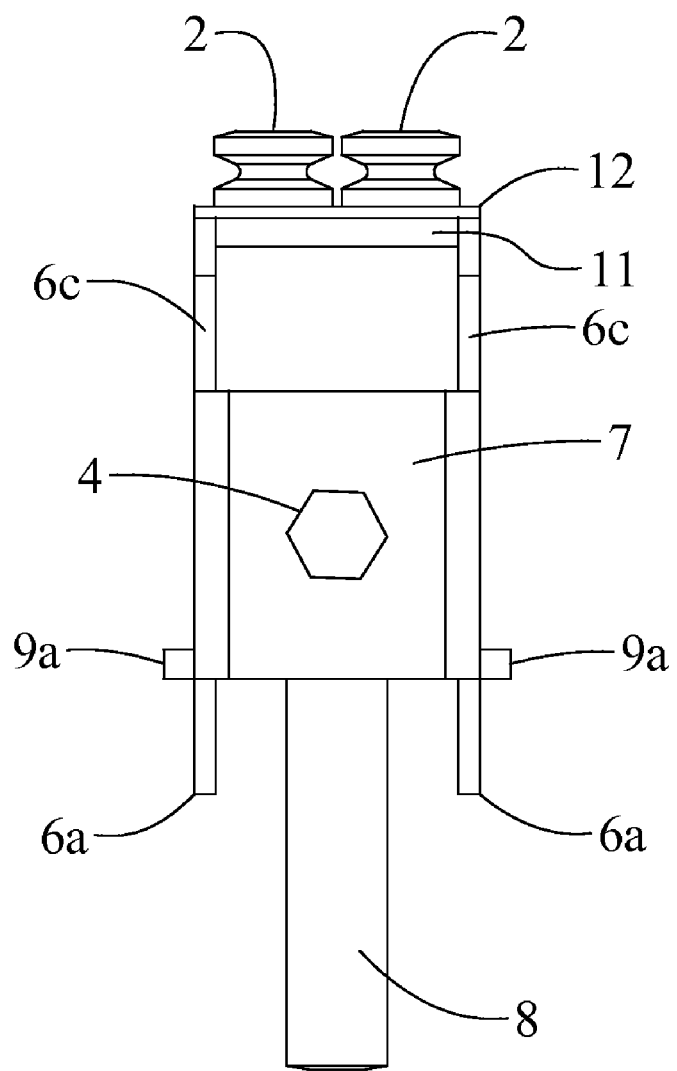
FIG. 4 describes a front view of the present invention.

The frame appears on end viewing the front of the frame at the panel 7 in FIG. 4. The head 4, shown as a hex shape, accepts a driver such as a socket or wrench. The panel attaches to the webs 6a of both sides and generally has a rectangular shape with the long axis vertical, or parallel to the pin 8. The webs extend below the panel and rearwardly from the panel. The slots in the webs allow the edges 9a of the bar 9 to extend slightly outward of each web 6a. The webs extend upwardly above the height of the panel into the flanges of each side. On edge, the webs appear through the arcuate edge 6c here shown above the panel 7. The flanges are mutually parallel and spaced apart.

The flanges are capped with a top 11 generally located between the flanges and perpendicular to the panel. The top and the flanges form a flush joint. Upon the top, the frame has a non-marring layer 12 that extends over the top and the edges of the flanges. The non-marring layer covers the uppermost portion of the frame that comes close to a rim during usage thus minimizing marring of the rim. Upon the non-marring layer, two wheels rest and connect through the layer to the top. The wheels are positioned to the inside edge of the non-marring layer. The centers of both wheels are adjacent and the common diameter through the center of both wheels is perpendicular to the threaded rod. Each wheel has a beveled top and an indent, or notch, to accept a rim as later described.

Figure 5:
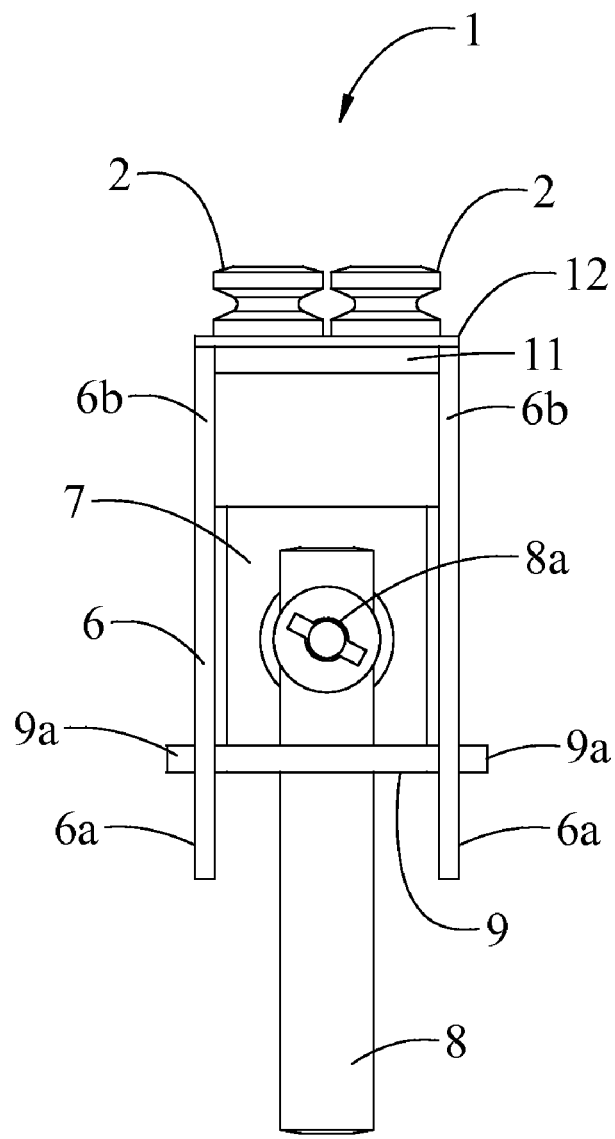
FIG. 5 shows a back view of the present invention.

Looking from the rear in FIG. 5, the frame's cross section appears as an inverted U shape formed by the upright webs 6a extending into the flanges 6b capped by the top 11. The top is flush with the flanges 6b and the non-marring layer 12 rests upon the top and spans over the flanges. The wheels 2 rest upon the non-marring layer with the axis through the center of each wheel being generally parallel to the pin 8. Inwardly from the webs 6a, the pin 8 extends vertically within the frame and has a substantial portion of its length below the bottom of the webs 6a. The pin travels in a bar 9 that spans to and through both sides 6. The edges 9a of the bar travel in slots in the webs as previously described. Behind the pin and below the elevation of the top, the panel 7 connects to both webs 6a. The panel spans the webs but has a height similar to the lower end of the arcuate edge.

Figure 6:
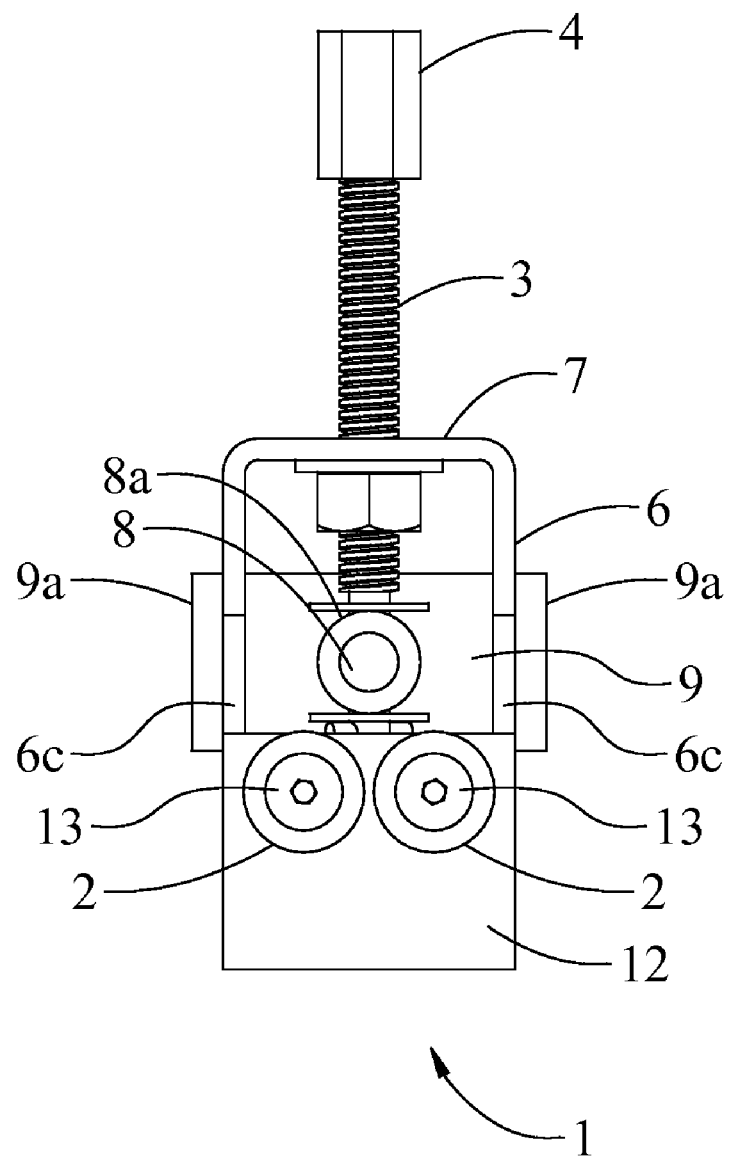
FIG. 6 shows a top view of the invention.

Above the frame of the invention, the frame has another apparent U shape in FIG. 6. The U shape has the two sides 6 joining with the panel 7 generally perpendicular to the sides. This view illustrates one assembly of the frame where the sides 6 and panel 7 are from a single piece of material and then bent into a U shape. Within the frame, the pin 8 travels within the bar 9 that extends through the sides as at 9a. The pin connects to the threaded rod 3 through an aperture or a journaled bearing as at 8a. The threaded rod rotates about its own axis as the pin moves towards and away from the wheels 2 upon the non-marring layer 12.

The wheels 2 are generally adjacent and have their centers upon a common diameter that is perpendicular to the threaded rod. Each wheel has a round shape with a beveled top. Inside of the top, each wheel has a hole to admit a bolt 13 for securing the wheel to the top. The bolt has a head 13a that rests within the bevel of the top holding the wheel flat upon the frame. The top of each wheel appears in more detail in FIG. 7 as a top view. Each wheel is round with an outside radius that begins an upward bevel 2a. The bevel continues towards the center but stops short at the edge of a seat 2b where the thickness of the wheel lessens to accommodate the head 13a of the bolt. The bolt passes through a centered hole 2c that extends through the thickness of the wheel. The bolt 13 turns into a matching threaded hole in the top. In the preferred embodiment, the head of each bolt has a hexagonal aperture for turning though alternative apertures, such as slotted or shaped are possible.

Figures 7, 8:
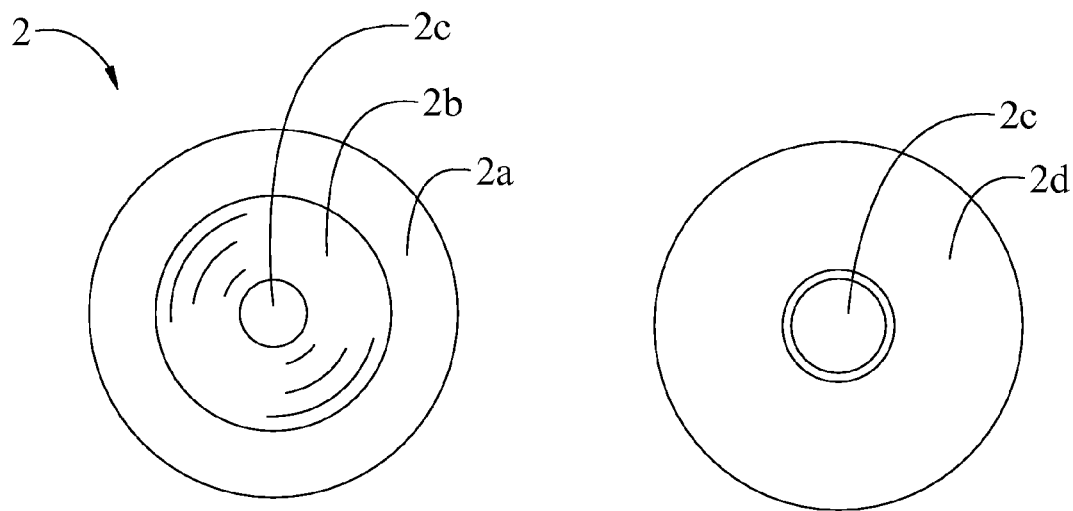
FIG. 7 shows a top view of a wheel of the invention.
FIG. 8 illustrates a bottom view of the wheel.

Flipping the wheel over, FIG. 8 shows the bottom view of a wheel. The round wheel has an outer radius 2d and a planar bottom for a flush placement of a wheel upon the non-marring layer. The centered hole 2c admits the bolt 13 for securement of the wheel to the top as shown in FIG. 9.

Figure 9:
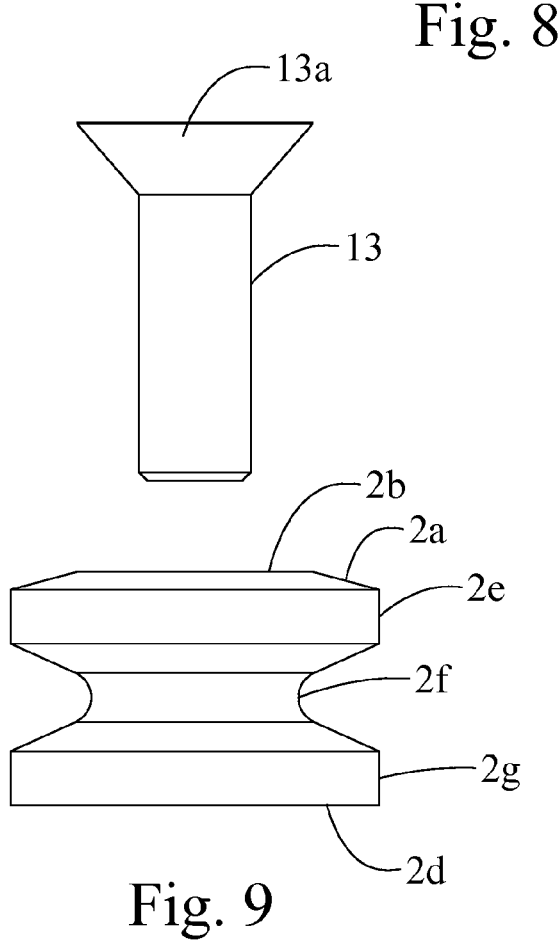
FIG. 9 shows a side view of the wheel of the invention.

FIG. 9 describes the wheel 2 from the side, as if installed upon the non-marring layer, ready to accept the rim of a wheel for a tire change. The wheel has a centered hole 2c that admits the bolt 13 for the head 13a to rest within the seat 2b. Beneath the bevel 2a, the wheel has an outer edge 2e with a diameter of the outer radius 2d and a thickness less than one third of the height of the wheel. The outer edge proceeds away from the bevel to the beginning of the notch 2f. The notch represents a shaped reduction in diameter of the wheel where the notch has an arcuate appearance when seen on edge in this view. Alternatively the notch is semi-circular or elliptical. The notch is generally symmetric and the minimum diameter of the notch leaves sufficient diameter to the wheel to prevent breakage of the wheel when the threaded rod imposes clamping forces through the wheel. Opposite the outer edge, the notch ends with the inner edge 2g. The inner edge has the same diameter as the outer edge, the outer radius 2d. The inner edge has less thickness than the outer edge and lacks a bevel. Generally the inner edge is perpendicular to the bottom of the wheel.

From this description, an adjustable clamp with gripping wheels has been described. The adjustable clamp is uniquely capable of gripping the rim of a wheel without marring while permitting adjustment of the clamp from a central point, the hub of a wheel. The frame is predominantly made from steel bent into a U shape with the wheels being made from polyethylene or nylon. The mounting lever and its various components may be manufactured from many materials, polymers, polyvinyl chloride, high density polyethylene, polypropylene, nylon, steel, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device for securing the rim of a wheel to the arms of an assembly, without marring said wheel, comprising:

a frame, having two mutually parallel and spaced apart sides, a panel scanning between said sides opposite said wheel;

a means for adjusting the position of said frame upon an arm;

a pin, connecting to said adjusting means, said pin being generally perpendicular to said adjusting means, said pin moving with said adjusting means slideably engaging said sides;

said adjusting means passing through said panel and journaling into said pin;

each of said sides having a slot therethrough, generally rectangular and in the direction of movement of said frame;

a bar, extending through said slots and both sides, said bar having a centered aperture for admitting said pin;

said pin having a length extending below said frame;

said bar, said slots, and said adjusting means cooperate in avoiding the tilting of said pin during movement of said frame; and, at least one non-marring wheel upon said frame opposite said adjusting means and said pin, said wheel having a circumferential notch suitable for gripping the rim.

2. The rim securing device of claim 1 further comprising:

said adjusting means having a threaded rod with two ends, a head upon one end of said threaded rod, and the other end of said rod engaging the aperture on said pin;

said panel having a threaded engagement with said rod wherein turning said threaded rod in cooperation with said threaded engagement moves said frame.

3. The rim securing device of claim 2 further comprising:
said other end of said threaded rod being journaled into said pin.

4. The bead placing device of claim 1 further comprising:
said frame having a top spanning between said sides opposite and perpendicular to said panel;
said top securing said at least one wheel.

5. The bead placing device of claim 4 further comprising:
at least one non-marring layer locating upon said top opposite said sides, said non-marring layer extending outwardly from said top.

6. The bead placing device of claim 5 further comprising:
two of said wheels locating upon said non-marring layer, wherein a line between the centers of both wheels being perpendicular to said pin and said adjusting means.

7. The bead placing device of claim 4 further comprising:
each of said sides having a rotated "L" shape with a web defining the length of said frame and a perpendicular flange extending from said web away from said pin;
each of said flanges connecting to said top; and,
each of said webs connecting to said panel, said panel orienting generally perpendicular to said top and spacing away from said top.

\* \* \* \* \*